United States Patent
Park et al.

(10) Patent No.: US 10,116,216 B2
(45) Date of Patent: Oct. 30, 2018

(54) ULTRASONIC CONTROL SYSTEM AND METHOD FOR A BUCK-BOOST POWER CONVERTER

(71) Applicant: SEMICONDUCTOR COMPONENTS INDUSTRIES, LLC, Phoenix, AZ (US)

(72) Inventors: Jinseok Park, San Jose, CA (US); Han Zou, Gilbert, AZ (US); Kedar Bharat Patel, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 221 days.

(21) Appl. No.: 15/084,345

(22) Filed: Mar. 29, 2016

(65) Prior Publication Data

US 2017/0288550 A1     Oct. 5, 2017

(51) Int. Cl.
  H02M 3/158 (2006.01)
  H02M 1/14 (2006.01)
(52) U.S. Cl.
  CPC .......... H02M 3/1582 (2013.01); H02M 1/14 (2013.01)
(58) Field of Classification Search
  CPC ............ H02M 3/00; H02M 3/02; H02M 3/04; H02M 3/10; H02M 3/145; H02M 3/155; H02M 3/156; H02M 3/157; H02M 3/158; H02M 3/1582; H02M 3/1584; H02M 3/1588; H02M 1/08; H02M 1/14; H02M 1/143; H02M 1/146; H02M 1/15; H02M 2001/0009; H02M 2001/0025; H02M 2001/0038; H02M 2001/0041; H02M 2001/0067; H02M 2001/007

USPC ........ 323/205–211, 222–226, 259, 271–277, 323/282–286, 351; 363/65, 123–127
See application file for complete search history.

(56) References Cited

U.S. PATENT DOCUMENTS

| | | |
|---|---|---|
| 5,408,150 A | 4/1995 | Wilcox |
| 5,481,178 A | 1/1996 | Wilcox et al. |
| 5,929,620 A | 7/1999 | Dobkin et al. |
| 6,304,066 B1 | 10/2001 | Wilcox et al. |

(Continued)

OTHER PUBLICATIONS

Linear Technology Corporation, "LTC3780—High Efficiency, Synchronous, 4-Switch Buck-Boost Controller," Datasheet, LT 0413 REV F, 2005, pp. 1-30.

(Continued)

*Primary Examiner* — Gustavo Rosario Benitez
*Assistant Examiner* — Carlos Rivera-Perez
(74) *Attorney, Agent, or Firm* — Robert F. Hightower (57) ABSTRACT

An embodiment of a buck-boost power converter may include an inductor driver section configured to control four switches to control an output of the converter, and a PWM circuit to generate a PWM control signal responsive to an output level of the output. An embodiment of a switch control is configured to, when an on time of the second switch becomes less than a specified entry value, force the third switch to generate boot refreshing pulses with an on time of a specified duration value at a rate more than a specified frequency, and when an on time of the third switch becomes less than the specified entry value, force the second switch to generate boot refreshing pulses with an on time of the specified duration value at the rate more than the specified frequency.

20 Claims, 4 Drawing Sheets

(56) References Cited

U.S. PATENT DOCUMENTS

| | | | |
|---|---|---|---|
| 6,580,258 B2 | 6/2003 | Wilcox et al. | |
| 6,936,997 B2 | 8/2005 | Mullett | |
| 7,365,525 B2 | 4/2008 | Zhou et al. | |
| 7,394,231 B2 | 7/2008 | Flatness et al. | |
| 7,852,060 B2 | 12/2010 | Omet et al. | |
| 9,203,309 B2 | 12/2015 | Hawawini et al. | |
| 2014/0203761 A1* | 7/2014 | Paparrizos | H02M 3/1582 320/107 |
| 2016/0190931 A1* | 6/2016 | Zhang | H02M 3/1582 323/271 |

OTHER PUBLICATIONS

Lindear Technology Corporation, "LTC3789—High Efficiency, Synchronous, 4-Switch Buck-Boost Controller," Datasheet, LT 1114 REV B, 2010, pp. 1-30.

Jinseok Park et al., "A Sample-Data Model for Double Edge Current Programmed Mode Control (DECPM) in High-Frequency and Wide-Range DC-DC Converters," IEEE Transactions on Power Electronics, vol. 25, No. 4, Apr. 2010, p. 1023-1033.

\* cited by examiner

ULTRASONIC CONTROL SYSTEM AND METHOD FOR A BUCK-BOOST POWER CONVERTER

TECHNICAL FIELD

Aspects of the present disclosure relate to voltage regulators and, in particular, to an ultrasonic control system and method for a buck-boost power converter.

BACKGROUND

Modern electronic devices typically require some form of power conversion for their use. Increased demand of these electronic devices has driven the development of portable electronic devices (e.g., cellular telephones, personal entertainment devices, laptop computers, etc.) that function with electrical power sources with limited capacities, such as batteries. Conditioning electrical power from these electrical power sources to a form suitable for use by these portable electronic devices are often provided by direct current to direct current (DC/DC) converters. Nevertheless, due to the limited capacities provided by these portable electrical power sources, the efficiency of these DC/DC converters at all regions of operation is paramount.

SUMMARY

According to one aspect, a buck-boost power converter includes an inductor driver section, a pulse width modulated (PWM) section, and a switch control section. The inductor driver includes a first switch to selectively couple an input to a first node of an inductor, a second switch to selectively couple the first node of the inductor to a ground node, a third switch to selectively couple a second node of the inductor to the ground node, and a fourth switch to selectively couple the second node of the inductor to an output, and a pulse width modulated (PWM) to generate a PWM control signal responsive to an output level of the output. The switch control is configured to, when an on time of the second switch becomes less than a specified entry value, force the third switch to generate boot refreshing pulses with an on time of a specified duration value at the rate more than a specified frequency range, and when an on time of the third switch becomes less than the specified entry value, force the second switch to generate boot refreshing pulses with an on time of the specified duration value at the rate more than the specified frequency range.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

DETAILED DESCRIPTION

Embodiments of the present disclosure provide a buck-boost control circuit that enables a smooth transition to and/or from either of its two principle modes of operation (e.g., buck mode and boost mode) using an intermediary method referred to as a boot refreshing mode. The smooth transition is provided by a switch control that senses when an on time of a low side switch of either of an input section (e.g., buck section) or an output section (e.g., boost section) of an inductor driver section goes below a first specified value to force generation of boot refreshing pulses of its complementary section (e.g., boost section, buck section). In this manner, when the buck-boost control circuit is close to transitioning from the buck mode due to a decrease in input voltage or an increase in output voltage, the boost section may be forced on so that the control loop of the buck-boost control circuit may decrease the effective duty cycle of the buck section. Alternatively, when the buck-boost control circuit is close to transitioning from the boost mode due to an increase in input voltage or a decrease in output voltage, the buck section may be forced on so that the control loop of the buck-boost control circuit may decrease the effective duty cycle of the boost section. In this manner, the duty cycle of either the buck section or the boost section is restricted from approaching saturation and thus maintaining control of the output voltage for enhanced efficiency, while averting unwanted switching frequency shifts that may otherwise occur, such as a lowering of the switching frequency to an audible range (e.g., less than 20 Kilohertz).

In many cases, it is often necessary to provide regulated power to electronic systems while having a power source whose DC voltage varies above or below system's nominal voltage. Buck-boost dc/dc converters solve this problem with one single inductor, but usually exhibit lower efficiency than step-down (e.g., buck) or step-up (e.g., boost) converters. One solution has been to operate the device in buck, boost, or buck-boost modes as a function of input/output voltages; however, the transitions from one mode to another mode often causes high output ripple, which may be unacceptable for some applications due its severity or the frequencies at which it may occur.

Switching regulators used in portable electronic devices utilize a class of switching regulators commonly referred to as buck-boost switching regulators. Buck-boost switchers used in portable electronic devices typically operate in forward buck mode and in reverse boost mode. In forward buck mode, a voltage at an input port is bucked to produce a regulated voltage at an output port. In reverse boost mode, a voltage at the output port is boosted to produce a regulated voltage at the output port. Because voltage variation of the input port and the output port, the forward buck mode may migrate to boost mode or vice versa. Such a buck-boost switching regulator may be particularly useful for battery operated devices in which the electrical power source (e.g., a battery) may provide electrical power to a portable electronic device while having a charge level is greater or less than the nominal voltage rating of the portable electronic device.

Nevertheless, the buck-boost converter may suffer from large ripple when the input voltage and output voltage are relatively close to each other, a situation that may be exacerbated during high current operation. A common method is to force the circuit into buck-boost mode in which both the buck section and the boost section are active when the input voltage and output voltage are relatively close. However in many cases, this transition may cause a perturbation in the output voltage that is often undesirable as well as power efficiency reduction Current programmed mode control (CPM) is a particular type of control system used by buck-boost converters and may provide enhanced inherent overcurrent protection, superior dynamic response, and ease of implementation of current sharing over conventional buck-boost control systems. CPM control schemes include single edge modulation (e.g., peak CPM or valley CPM) to provide duty cycle control. In single edge CPM (hereafter referred to as "single CPM"), only one edge of the duty signal is modulated by the control scheme, and the other edge of the duty signal is unmodulated and determined by a fixed clock. In other words, the inductor current information is updated only once during a single switching period. Therefore, the bandwidth of a system utilizing single CPM is limited to half the switching frequency due to the corresponding sample and hold effects.

Another CPM control scheme includes dual edge modulation in which both edges of a PWM pulse train are used to provide duty cycle control. Nevertheless, for dual edge modulation of CPM (DECPM), there is often no effective method to reduce ripple voltage during transitions between buck and boost modes. Large output voltage ripple is often seen when both input voltage and output voltage are close to one another. One conventional approach to remedy this problem relies on moving the compensation voltage up and down dual ramp waveforms to create an operation in either of the buck or boost mode of operation. However near the middle of the ramp, the compensation signal has a dead zone where converter may lose regulation due to an excessive ON time of S2 and S3 switches prior to transition to a buck-boost mode of operation. As such, random pulses can occur that may in turn, causes output voltage wandering.

Figure 1A:
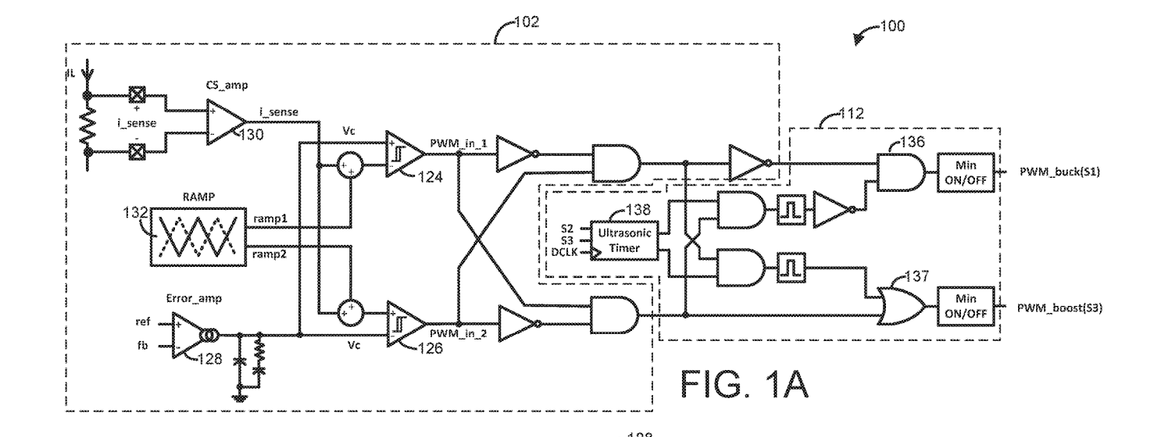
FIGS. 1A and 1B illustrate an example buck-boost converter according to one embodiment of the present disclosure.
Figure 1B:
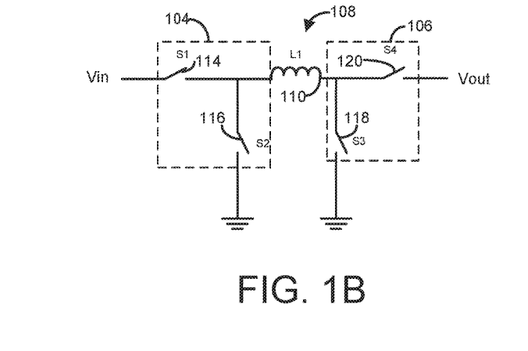

FIGS. 1A and 1B illustrate an example buck-boost converter 100 according to one embodiment of the present disclosure that may provide a solution to the aforementioned problems with buck-boost converters. The buck-boost converter 100 includes a pulse width modulation (PWM) section 102 that is used to generate PWM signals (PWM_buck and PWM_boost) to be fed to a buck section 104 and a boost section 106 of an inductor driver section 108. As will be described in detail below, the buck-boost converter 100 also includes a switch control section 112 that is configured to, when a switch (S2) on time of the buck section becomes less than a specified entry value, force the boost section to generate boot refreshing pulses with a switch (S3) on time of a specified duration value at the rate more than the specified frequency range, and when a switch (S3) on time of the boost section becomes less than the specified entry value, force the buck section to generate boot refreshing pulses with an switch (S2) on time of the specified duration value at the rate more than the specified frequency range. Such behavior may be useful for periodically refreshing the switches of the currently unused section (e.g., buck section or boost section) so that the switching frequency may be maintained above a certain level, such as an audible level (e.g., below 20 Kilohertz) that would otherwise introduce unwanted noise into portable electronics devices.

In general, actuation of the boot refreshing pulses by the switch control section 112 may be performed during a mode of operation referred to as a boot refreshing mode. The boot refreshing pulses may be used to periodically turn the currently unused section on when the currently used section is approaching saturation (e.g., 100 percent duty cycle of the buck section or 0 percent duty cycle of the boost section). Thus, the switch control section 112 may cause the buck-boost converter 100 to enter the boot refreshing mode as the input voltage (Vin) approaches that of the output voltage (Vout) and exit the boot refreshing mode when the input voltage (Vin) is no longer close to the input voltage (Vout). In this manner, a compensation signal (Vc) will be forced out of the dead zone so that active control may be maintained when the input voltage (Vin) is close to the output voltage (Vout).

The particular PWM section 102 as shown is a dual edge current programmable modulation (DECPM) controller in which a current programmed mode control (CPM) scheme is used with dual edge modulation (e.g., leading edge modulation and trailing edge modulation). Nevertheless, it is contemplated that embodiments of the switch control section 112 implementing boot refreshing pulses may be implemented with any type of buck-boost controller scheme, such as single edge CPM or other conventional type of buck-boost controller used to control the operation of buck-boost converters. DECPM-based buck-boost converters may be particularly advantageous because they provide a continuous transition between the buck and boost modes. DECPM-based converters generally are not required to have a real buck-boost mode with all switches operating when Vin is near Vout, a condition that lowers its efficiency. Additionally DECPM-based converters provide a dual edge ramp that effectively doubles the sampling frequency to allow a faster loop bandwidth. That is, DECPM-based converters may achieve a faster transient response due to increased sampling frequency. For example, DECPM-based converters may have twice the sampling frequency over conventional buck-boost controllers when the duty cycle approximates 0.5. Additionally, the DECPM-based converters can improve the tracking accuracy of the output voltage to the reference signal.

Due to the fact that DECPM-based converters have a higher sampling frequency of the control and a larger current loop gain at high frequency than conventional single edge CPM converters, they are often a preferred candidate for high-frequency and wide-range DC-DC operation, which are growing in popularity for portable and vehicle applications. A stable control scheme for these converters is often difficult to achieve, because the transfer function of the system changes with the system's operating point. Of special note is the four-switch buck boost converter (4SBBC)

for portable and vehicle applications, which usually operates in either the buck or boost mode to decrease losses by switching only two switches in single switching period. In this application, the transfer function change is even more severe due to the presence of different system dynamics between the buck and boost modes.

Embodiments of the present disclosure may provide certain advantages not heretofore recognized by conventional control systems and techniques for buck-boost controllers. For example, one advantage may be reduced output voltage ripple due to active control being maintained by the PWM section 102. Additionally, by ensuring active regulation, the PWM switching frequency may be maintained at a constant level. In conventional buck-boost controllers, transitioning from either the buck mode or the boost mode often incurs temporary loss of regulation such that the switching frequency of the PWM signal is reduced to audible levels (e.g., less than 20 Kilohertz), a problem that is undesirable when used with portable electronics devices incorporated with audio-based circuitry. Embodiments of the present disclosure provide a solution to this problem by ensuring that the buck section 104 and boost section 106 maintain active regulation such that the switching frequency is not reduced for reduction or elimination of noise that would otherwise be incurred by their use with portable electronic devices.

The inductor driver section 108 includes a buck section 104 that selectively couples an input (Vin) to an inductor 110, and a boost section 106 that selectively couples an opposing end of the inductor 110 to an output (Vout). The buck section 104 includes a high side switch 114 and a low side switch 116. Likewise, the boost section 106 includes a low side switch 118 and a high side switch 120. In general, the buck section 104 is configured to alternatively energize the inductor for generating an output voltage that is less than the input voltage, while the boost section 106 is configured to energize the inductor 110 for generating an output voltage that is greater than the input voltage. Such an inductor driver section may be referred to as a four switch buck-boost converter. The switches include metal oxide semiconductor field effect switches (MOSFETs). However, the switches may be any type that switches electrical power to the inductor 110 at a desired speed and power density level.

The PWM section 102 generally includes a buck comparator 124, a boost comparator 126, an error amplifier 128, a current sense amplifier 130, and a ramp generator 132. The buck comparator 124 and the boost comparator 126 generate signals according to a compensation signal (Vc) received from the error amplifier 128, ramp signals (ramp1 and ramp2) generated by the ramp signal generator 132, and a current sense signal (i_sense) received from a current sense amplifier 130. The PWM signals (PWM_buck and PWM_boost) are fed to the inductor drive section 108, which are gated by the switch control section 112.

The switch control section 112 includes an AND date 136 and an OR gate 137 that gates the PWM signals from the PWM section 102 to the inductor driver section 108. The AND gates 136 an OR gate 137 are controlled by a timer circuit 138 that generates the boot refreshing pulses according to a buck section low side switch signal (S2), a boost section low side switch signal (S3), and a clock input signal (DCLK). In general, the buck section low side switch signal (S2) for boot refreshing pulse is on when the boost section low side switch is on, while the boost section low side switch signal (S3) for boot refreshing pulse is on when the buck section low side switch is on (e.g., the on time of the boost section low side switch). In this manner, the duty cycle of either the buck section or the boost section is restricted from approaching saturation (e.g., approaching 100 percent duty cycle of the buck section or approaching 0 percent duty cycle of the boost section)

The timer circuit 138 includes circuitry for determining a specified on time value of the buck section low side switch 116 and the boost section low side switch 118 as well as a quantity of consecutive times that the buck section low side switch 116 and the boost section low side switch 118 exhibit those specified on time values. The timer circuit 138 also includes circuitry for generating the boot refreshing pulses at the rate more than the specified frequency range in accordance with the measured specified on time values. The circuitry used for this purpose may include any suitable type. For example, the timer circuit 138 may include one or more processors that execute instructions stored in one or more memory devices (e.g., an embedded controller). Other example of suitable types of circuitry may include one or more field programmable gate arrays (FPGAs), one or more application specific integrated circuits (ASIC), one or more state machine elements incorporating Boolean building blocks (AND gates, OR gates, inverter gates, etc.) and stateful components (e.g., RS flip-flops, D flip-flops, JK flip-flops, etc.), or any combination thereof. The timer circuit 138 may be formed on a single monolithic substrate or it may be formed from one or more discrete components. Additionally, the timer circuit 138 may exist as a discrete component or it may be integrated with one or more other components, such as one or more components of the switch control section 112 and/or the PWM section 102 described herein above.

Figure 2A:
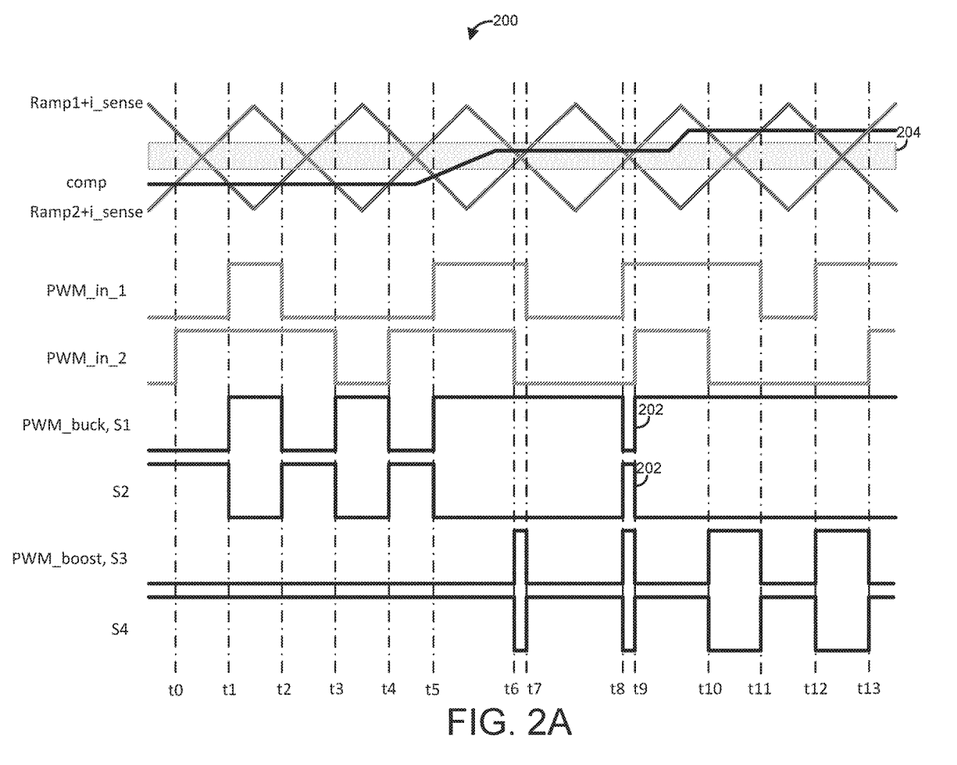
FIG. 2A illustrates an example waveform graph showing relative states and voltage levels of the various components of the buck-boost converter of FIGS. 1A and 1B that transitions from the buck mode to the boot refreshing mode and then to the boost mode according to one embodiment of the present disclosure.

FIG. 2A illustrates an example waveform graph 200 showing relative states and voltage levels of the various components of the buck-boost converter 100 of FIGS. 1A and 1B that transitions that transitions from the buck mode to the boot refreshing mode and then to the boost mode according to one embodiment of the present disclosure. As will be described in detail herein below, the switch control section 112 may be configured to generate boot refreshing pulses 202 to keep a compensation signal (Vc) out of a dead zone 204, which is a range of operation in which the input voltage (Vin) of the buck-boost converter 100 is close to its output voltage (Vout).

Initially, at time (t0), the rising slope of the ramp signal (ramp2+isense) causes the comparator 126 to drive the PWM_in_2 to a logic high condition. Thereafter at time (t1), the rising slope of the PWM_in_1 causes switch (s1) to turn on and switch (s2) to turn off to commence charging of the inductor 110. Charging of the inductor 110 continues until time (t2) in which the rising slope of the ramp signal (ramp1+isense) causes the comparator 124 to de-activate the PWM_in_1 which in turn, causes the switch (s1) to turn off and switch (s2) to turn on so that the inductor 110 begins to be discharged through the switch (s2). The aforedescribed process is continued through time (t3) and (t4) to alternatively charge and discharge the inductor 110 via switches (s1) and (s2). The actions of the buck-boost converter 100 at shown at times (t0 through t4) describe the buck mode of operation.

Over time the input voltage (Vin) may decrease or the output voltage (Vout) may increase such that the compensation signal (Vc) goes higher. Therefore, at time (t5), the falling slope of the ramp signal (ramp1+isense) causes the comparator 124 to drive the PWM_in_1, which in turn, causes the switch (s1) to turn on and switch (s2) to turn off. Thereafter at time (t6), the falling edge of the ramp signal (ramp2+isense) causes the comparator 126 to de-activate the PWM_in_2 which in turn, causes the switch (S3) to turn on and switch (S4) to turn off so that the inductor 110 begins to be charged through the switch (S3). This is a transition period from buck to boost mode. Then at time (t7), the rising slope of the ramp signal (ramp1+isense) causes the comparator 124 to de-activate the PWM_in_1, which in turn, causes the switch (s3) to turn off and switch (s4) to turn on so that the inductor 110 begins to be discharged through the switch (s4). Nevertheless, between time (t6) and (t7), the pulse width of switch (s3) is less than the entry value due to the dead zone such that the dynamic ultrasonic boot refreshing mode is triggered. As a result, switch (s2) is on at time (t8) as a boot refreshing pulse 202 when switch (s3) is on while in the dynamic ultrasonic boot refreshing mode. Although only one boot refreshing pulse 202 is shown, it should be understood that the switch control section 112 may periodically generate ongoing boot refreshing pulses 202 at the rate more than the specified frequency range generated by the PWM section 102 so that the compensation signal (Vc) is kept from going into the dead zone 204. This mode of operation may be referred to as a boot refreshing mode of operation. The boot refreshing pulses 202 may have been triggered at any suitable frequency. In one embodiment, the specified frequency is selected so that a frequency of the PWM signal is maintained above an audible frequency under all anticipated operating conditions.

As the input voltage (Vin) is continually decreased or the output voltage (Vout) is continually increasing, the switch control section 112 exits the boot refreshing mode when the compensation signal (Vc) goes above the dead zone 204. Providing an exit transition from the boot refreshing mode to either the buck mode or boost mode may be useful for handling conditions where the input voltage (Vin) has further increased or decreased such that the compensation signal (Vc) is no longer in the dead zone 204. For example, the switch control section 112 may transition the buck-boost converter 100 from the buck mode to the boot refreshing mode before the input voltage (Vin) decreases such that the compensation signal (Vc) goes into the dead zone, and transition the buck-boost converter 100 from the boot refreshing mode to the boost mode when the input voltage (Vin) further decreases such that the compensation signal (Vc) goes past the dead zone 204 where the buck-boost converter 100 is not allowed to operate in the buck mode or the boost mode while in the dead zone 204. Conversely, the switch control section 112 may transition the buck-boost converter 100 from the boost mode to the boot refreshing mode before the input voltage (Vin) increases such that the compensation signal (Vc) goes into the dead zone, and transition the buck-boost converter 100 from the boot refreshing mode to the buck mode when the input voltage (Vin) further increases such that the compensation signal (Vc) goes past the dead zone 204 where the buck-boost converter 100 is not allowed to operate in the buck mode or the boost mode while in the dead zone.

Therefore, at time (t10), the falling slope of the ramp signal (ramp2+isense) causes the comparator 126 to de-activate the PWM_in_2 which in turn, causes the switch (s3) to turn on and switch (s4) to turn off to commence charging of the inductor 110. Thereafter at time (t11), the rising slope of the ramp signal (ramp1+isense) causes the comparator 124 to de-activate the PWM_in_1 so that the boost section low side switch 118 (s3) to go turn off and the boost section high side switch 120 (s4) to turn on so that the energy stored in the inductor 110 may be fed to the output (Vout). The aforedescribed process is continued through time (t12 and (t13) to alternatively charge and discharge the inductor 110 via the boost section low side switch 118 (s3) and the boost section high side switch 120 (s4). The actions of the buck-boost converter 100 at shown at times (t10 through t13) describe the boost mode of operation.

Figure 2B:
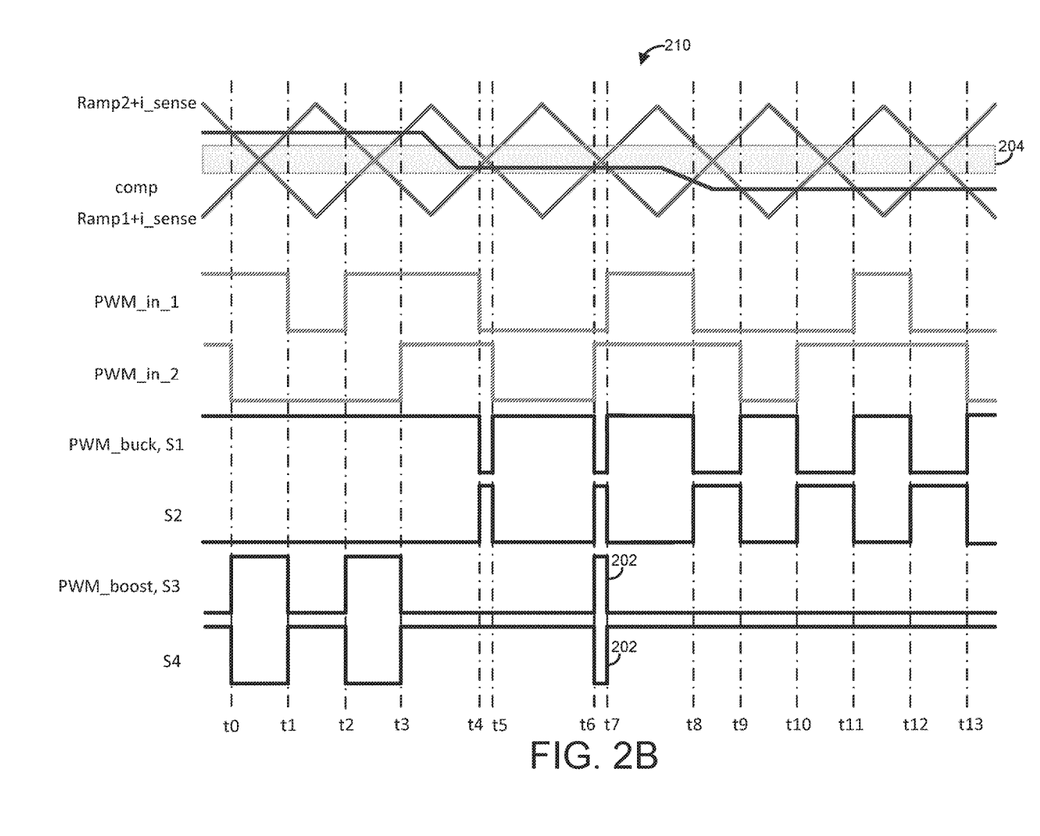
FIG. 2B illustrates another example waveform graph showing relative states and voltage levels of the various components of the buck-boost converter of FIGS. 1A and 1B that transitions from the boost mode to the boot refreshing mode and then to the buck mode according to one embodiment of the present disclosure.

FIG. 2B illustrates an example waveform graph 210 showing relative states and voltage levels of the various components of the buck-boost converter 100 of FIGS. 1A and 1B that transitions from the boost mode to the boot refreshing mode and then to the buck mode according to one embodiment of the present disclosure. Similar to the graph 200 shown above, the graph 210 shows how the switch control section 112 may be configured to generate boot refreshing pulses 202 to keep a compensation signal (Vc) out of a dead zone 204, which is a range of operation in which the input voltage (Vin) of the buck-boost converter 100 is close to its output voltage (Vout).

Initially, at time (t0), the falling slope of the PWM_in_2 signal causes switch (s3=PWM_boost) to turn on and switch (s4) to turn off to commence charging of the inductor 110. Charging of the inductor 110 continues until time (t1) in which the rising slope of the ramp signal (ramp1+isense) causes the comparator 124 to de-activate the PWM_in_1 signal which in turn, causes the switch (s3=PWM_boost) to turn off and switch (s4) to turn on so that the inductor 110 begins to be discharged through the switch (s4). The aforedescribed process is continued through time (t2) and (t3) to alternatively charge and discharge the inductor 110 via switches (s3) and (s4). The actions of the buck-boost converter 100 at shown at times (t0 through t3) describe the boost mode of operation.

Over time the input voltage (Vin) may increase or the output voltage (Vout) may decrease such that the compensation signal (Vc) goes lower. Therefore, at time (t4), the rising slope of the ramp signal (ramp1+isense) causes the comparator 124 to de-activate the PWM_in_1 signal, which in turn, causes the switch (s1) to turn off and switch (s2) to turn on so that the inductor 110 begins to be discharged through the switch (s2). Nevertheless, between time (t4) and (t5), the pulse width of switch (s1) is less than the entry value due to the dead zone such that the dynamic ultrasonic boot refreshing mode is triggered. As a result, switch (s3) is on at time (t6) when switch (s2) is on while in the dynamic ultra-sonic boot refreshing mode. This mode of operation may be referred to as a boot refreshing mode of operation.

As the input voltage (Vin) is continually increased or the output voltage (Vout) continually decrease, the switch control section 112 exits the boot refreshing mode when the compensation signal (Vc) goes below the dead zone 204. Therefore, at time (t8), the rising slope of the ramp signal (ramp1+i_sense) causes the comparator 124 to de-activate the PWM_in_1, thus causing the buck section high side switch 114 (s1) to turn off and the buck section low side switch 116 (s2) to turn on so that the energy stored in the inductor 110 may be grounded through the buck section low side switch 116. Thereafter at time (t9), the falling slope of the ramp signal (ramp2+i_sense) causes the comparator 126 to drive the PWM_in_2 to a logic low condition so that the buck section high side switch 114 (s1) to turn on and the buck section low side switch 116 (s2) to turn off so that the energy stored in the inductor 110 may be fed to the output (Vout). The aforedescribed process is continued through time (t8 and t9) to alternatively charge and discharge the inductor 110 via the buck section high side switch 114 (s1) and the buck section low side switch 116 (s2). The actions of the buck-boost converter 100 at shown at times (t8 through t13) describe the buck mode of operation.

Figure 3:
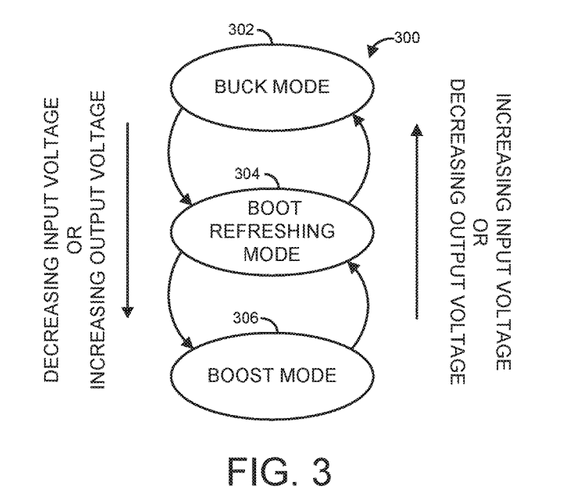
FIG. 3 illustrates an example state diagram showing how the buck-boost converter of FIGS. 1A and 1B may alternate between its differing operating modes according to one embodiment of the present disclosure.

FIG. 3 illustrates an example state diagram 300 showing how the buck-boost converter 100 may alternate between its differing operating modes according to one embodiment of the present disclosure. The operating modes of the buck-boost converter 100 include a buck mode 302, a boot refreshing mode 304, and a boost mode 306 of operation. According to the teachings of the present disclosure, the boot refreshing mode 304 is activated by the switch control section 112 when either of buck section low side switch 116 or the boost section low side switch 118 turns on for a duration that is below a specified value and optionally for a specified successive quantity of times. The arrows shown to the left of each mode indicate a mode transition that may occur as the input voltage is decreasing or the output voltage is increasing, such as due to the effects of a battery, which is supplying the input voltage, while it is being discharged or the output voltage is increasing. Conversely, the arrows shown to the right of each mode indicate the mode transitions that may occur as the input voltage is increasing or output voltage is decreasing, such as due to the effects of the battery while it is being charged or output voltage is decreasing.

Entry into the boot refreshing mode 304 from the buck mode 302 or the boost mode 306 and exit of the boot refreshing mode 304 to either the buck mode 302 or boost mode 306 may be controlled by the switch control section 112. The switch control section 112 continually measures the duration of the on time of each low side switch 116 and 118 and compares the measured on time duration with a specified minimum entry value to determine whether to transition to the boot refreshing mode 304. In one embodiment, the switch control section 112 may also count how many consecutive times that the on time pulses of each low side switch goes below the specified minimum entry value. For example, the switch control section 112 may be operable to count a quantity of consecutive times that the on times of either low side switch, compare the counted value to the specified quantity, and transition the buck-boost converter 100 to the boot refreshing mode 304 when the specified quantity has been met.

The switch control section 112 may control exiting from the boot refreshing mode 304 by measuring the duration of the on time of each low side switch 116 and 118, and comparing the measured on time duration with a specified maximum exit value to determine whether to transition from the boot refreshing mode 304 back to either the buck mode 302 or the boost mode 306. In one embodiment, the maximum exit value may be greater than the minimum entry value. In this manner, a time-based hysteresis loop may be formed for ensuring that the switch control section 112 does unduly cycle in and out of the boot refreshing mode due to various reasons, such as noise present in the current sense signal (i_sense), or other signals used to control the operation of the switch control section 112. In other embodiments, the maximum exit value may be essentially equal to the minimum entry value if this feature is not needed or desired.

The switch control section 112 may count the on time of the low side switches 116 and 118 in any suitable manner. In a particular example, the switch control section 112 may count the on time by periodically sampling the on time of the signal (s2 and s3) to determine the on time value. The sampling period may be any value that is less than the minimum specified on time of the low side switches 116 and 118. For example, if the switching period of the PWM signal is nominally 200 nano-seconds, the sampling period may be set to 40 nano-seconds such that a relatively accurate estimation of the on time of the low side switches may be obtained.

Figure 4:
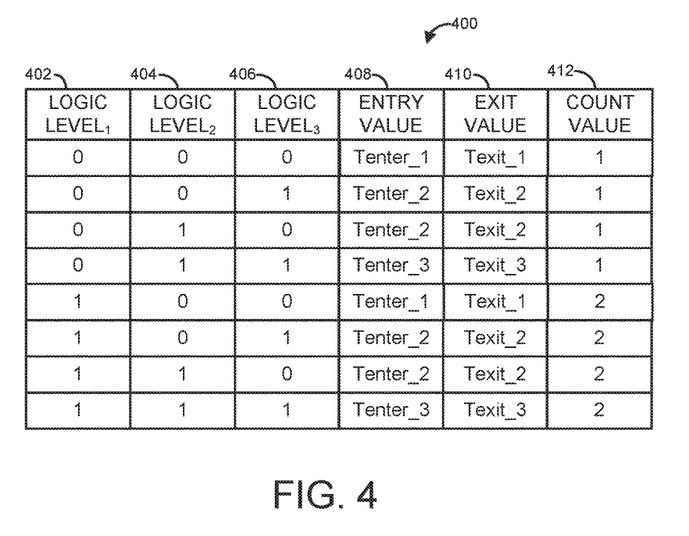
FIG. 4 illustrates an example table showing how the switch control may be manipulated to select the specified on time value for entry into the boot refreshing mode, another specified on time value for exit from the boot refreshing mode, and a count of how many consecutive times that the pulses of the low side switches of the buck-boost converter of FIGS. 1A and 1B are below the specified values according to one embodiment of the present disclosure.

FIG. 4 illustrates an example table 400 showing how the switch control section 112 may be manipulated to select the specified minimum on time value for entry into the boot refreshing mode 304, another specified on time value for exit from the boot refreshing mode 304, and a count of how many consecutive times that the pulses of the low side switches 116 and 118 are below the specified values according to one embodiment of the present disclosure. In general, entry into the boot refreshing mode 304 may be referred to entering the boot refreshing mode 304 from either the buck mode 302 or boost mode 306, while exiting from the boot refreshing modes may be referred to as transitioning from the boot refreshing mode 304 to either the buck mode 302 or the boost mode 306.

The table 400 is arranged in columns including three selectable logic levels 402, 404, and 406, a specified on time entry value 408, a specified on time exit value 410, and a pulse count value 412, and rows indicating which boot refreshing mode specified on time entry value 408, specified on time exit value 410, and pulse count value 412 that may be selected due to setting of a selected combination of the logic levels 402, 404, and 406. For example, if the logic level1, logic level2, and logic level3 are set to '0', '0', and '0', respectively, then the boot refreshing mode specified on time entry value 408 may be set to Tenter_1 (e.g., 80 nano-seconds), the specified on time exit value 410 may be set to Tenter_2 (e.g., 160 nano-seconds), and the pulse count value 412 may be set to '1'. That is, the switch control section 112 may be set to enter the boot refreshing mode 304 when the on time of either of the low side switches 116 or 118 has a duration of less than a first value of Tenter_1 for one time and exit the boot refreshing mode 304 when the on time of either of the low side switches 116 or 118 has a duration of greater than Texit_1. As another example, if the logic level$_1$, logic level$_2$, and logic level$_3$ are set to '1', '1', and '1', respectively, then the boot refreshing mode specified on time entry value 408 may be set to Tenter_2, the specified on time exit value 410 may be set to Texit_3 (e.g., 240 nano-seconds), and the pulse count value 412 may be set to '2'. That is, the switch control section 112 may be set to enter the boot refreshing mode 304 when the on time of either of the low side switches 116 or 118 has a duration of less than Tenter_2 for one time and exit the boot refreshing mode 304 when the on time of either of the low side switches 116 or 118 has a duration of greater than Texit_3. Although certain entry on time values, exit on time values, and pulse count values are shown, it should be understood that any desired entry on time values, exit one value, and/or pulse count values may be used without departing from the spirit and scope of the present disclosure. For example, the switch control section 112 may be set to have a pulse count value of three or more pulses to trigger a transition to or from the boot refreshing mode 304.

The logic levels 402, 404, and 406 may be selected in any suitable manner. In one embodiment, the switch control section 112 may include one or more fuses that may be selectively blown to select the desired entry value 408, exit value 410, and pulse count value 412. Other types of settable mechanisms may be used. For example, the switch control section 112 may include one or more internal registers that may be remotely set by communicating with the switch control section 112 using a suitable communication medium. As another example, the switch control section 112 may include one or more externally available output pins that may be pulled to a logic high or low level to select the desired entry value 408, exit value 410, and pulse count value 412.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A circuit for a buck-boost power converter comprising:
   an inductor driver comprising a first switch to selectively couple an input to a first node of an inductor, a second switch to selectively couple the first node of the inductor to a ground node, a third switch to selectively couple a second node of the inductor to the ground node, and a fourth switch to selectively couple the second node of the inductor to an output;
   a pulse width modulator (PWM) to generate a PWM control signal responsive to an output level of the output;
   a switch control in communication with the second switch and the third switch;
   the circuit configured to operate in a buck mode with the fourth switch enabled for the buck mode and to begin to transition to a boost mode wherein the switch control is configured to, during the transition to the boost mode, detect an on time of the third switch less than a specified entry value and force the second switch to generate first boot refreshing pulses so that the second switch is enabled, during an on-time of the third switch, with an on time of a specified duration value at a rate more than a specified frequency, the circuit configured to subsequently operate in the boost mode after generation of the first boot refreshing pulses;
   the circuit configured to operate in the boost mode with the first switch enabled for the boost mode and to begin to transition to the buck mode wherein the switch control is configured to, during the transition to the buck mode, detect on time of the second switch less than the specified entry value and force the third switch to generate second boot refreshing pulses so that the third switch is enabled, during an on time of the second switch, with an on time of the specified duration value at a rate more than the specified frequency, the circuit configured to subsequently operate in the buck mode after generation of the second boot refreshing pulses.

2. The circuit of claim 1, wherein, when the switch control is generating the first or second boot refreshing pulses, and when the on time of the second switch or the third switch becomes greater than a specified exit value, cease generating the first or second boot refreshing pulses.

3. The circuit of claim 2, wherein the specified exit value is greater than the specified entry value.

4. The circuit of claim 2, wherein the specified exit value is essentially equal to the specified entry value.

5. The circuit of claim 1, wherein the specified duration value is selected so that a frequency of the PWM control signal is maintained above 20 Kilohertz.

6. The circuit of claim 1, wherein the switch control is configured to, when the on time of the second switch becomes less thane a first specified entry value for a specified successive quantity of times, force the third switch to generate the second boot refreshing pulses at the rate more than the specified frequency, and when the on time of the third switch becomes less than a third specified entry value for the specified successive quantity of times, force the second switch to generate the first boot refreshing pulses at the rate more than the specified frequency.

7. The circuit of claim 6, wherein the switch control comprises circuitry to enable setting of at least one of the specified entry value, a specified exit value, and the specified successive quantity of times following manufacture of the switch control section.

8. The circuit of claim 1, wherein the PWM comprises a dual edge current programmed mode control (DECPM) controller.

9. The circuit of claim 1, wherein the specified frequency comprises an audible frequency level.

10. A method of forming a circuit for buck-boost control comprising:
    providing an inductor driver comprising a first switch to selectively couple an input to a first node of an inductor, a second switch to selectively couple the first node of the inductor to a ground node, a third switch to selectively couple a second node of the inductor to the ground node, and a fourth switch to selectively couple the second node of the inductor to an output, and a pulse width modulator (PWM) to generate a PWM control signal responsive to an output level of the output; and
    configuring an error section of the circuit to form a compensation signal that is representative of a deviation of the output level;
    configuring the PWM section to form a first ramp and a second ramp wherein the second ramp is complementary to the first ramp so that a peak of the first ramp occurs at a valley of the second ramp and wherein the first ramp crosses the second ramp substantially at a midpoint wherein a dead zone is a region around the midpoint;
    configuring the circuit to operate in a buck mode in response to the compensation signal having a value of one of greater than or less than the dead zone and to operate in a boost mode in response to the compensation signal being an opposite of one of greater than or less than the dead zone;
    configuring the circuit to transition from the buck mode to the boost mode in response to the compensation signal entering the dead zone wherein in response to detecting an on time of the third switch less than a specified entry value during the transition from the buck mode to the boost mode, force the second switch to generate first boot refreshing pulses which enable the second switch, during an on time of the third switch, with an on time of a specified duration value at the rate more than a specified frequency to move the compensation signal outside the dead zone, and wherein the circuit is configured to operate in the boost mode after generating the first boot pulses; and configuring the circuit to transition from the boost mode to the buck mode in response to the compensation signal entering the dead zone wherein in response to detecting an on time of the second switch less than the specified entry value during the transition from the boost mode to the buck mode, force the third switch to generate second boot refreshing pulses to enable the third switch, during an on time of the second switch, with an on time of the specified duration value at the rate more than the specified frequency.

11. The method of claim 10, further comprising configuring a switch control to, when the switch control is generating the first or second boot refreshing pulses and when the on time of the second switch or the third switch becomes greater than a specified exit value, cease generating the first or second boot refreshing pulses.

12. The method of claim 11, including configuring the switch control with the specified exit value greater than the specified entry value.

13. The method of claim 11, including configuring the switch control with the specified exit value essentially equal to the specified entry value.

14. The method of claim 10, further comprising selecting the specified duration value so that a frequency of the PWM control signal is maintained above 20 Kilohertz.

15. The method of claim 10, further comprising
configuring a switch control to: when the on time of the second switch becomes less than a first specified entry value for a specified successive quantity of times, force the third switch to generate the second boot refreshing pulses at the rate more than the specified frequency; and when the on time of the third switch becomes less than a third specified entry value for the specified successive quantity of times, force the second switch to generate the first boot refreshing pulses at the rate more than the specified frequency.

16. The method of claim 15, further comprising setting at least one of the specified entry value, a specified exit value, and the specified successive quantity of times following manufacture of the switch control section.

17. The method of claim 10, including configuring the PWM to include a dual edge current programmed mode control (DECPM) controller.

18. The method of claim 10 including configuring the PWM section to form the first ramp and the second ramp with substantially equal amplitudes.

19. A buck-boost power converter comprising:
an inductor driver comprising a first switch to selectively couple an input to a first node of an inductor, a second switch to selectively couple the first node of the inductor to a ground node, a third switch to selectively couple a second node of the inductor to the ground node, and a fourth switch to selectively couple the second node of the inductor to an output;
a pulse width modulator (PWM) to generate a PWM control signal responsive to an output level of the output, the PWM configured to form two complementary ramp signals that cross at substantially a midpoint and having a dead zone around the midpoint, the PWM configured to operate in a buck mode and a boost mode and to transition therebetween; and
a switch control to:
in response to an on time of the second switch less than a specified entry value for a specified quantity of times after exiting the boost mode and beginning a first transition to the buck mode, force the third switch to generate first boot refreshing pulses to enable the third switch, during an on time of the second switch, with an on time of a specified duration value at the rate more than a specified frequency wherein the PWM operates in the buck mode after completing the first boot refreshing pulses; and
in response to an on time of the third switch less than the specified entry value, for the specified quantity of times after exiting the buck mode and beginning a second transition to the boost mode, force the second switch to generate second boot refreshing pulses to enable the second switch, during an on time of the third switch, with an on time of the specified duration value at the rate more than the specified frequency wherein the PWM operates in the boost mode after completing the second boot refreshing pulses;
when the switch control is generating the first or second boot refreshing pulses and the on time of the second switch or the third switch becomes greater than a specified exit value, cease generating the first or second boot refreshing pulses.

20. The buck-boost power converter of claim 19, wherein the switch control comprises circuitry to enable setting of at least one of the specified entry value, the specified exit value, and the specified successive quantity of times following manufacture of the switch control section.

* * * * *

UNITED STATES PATENT AND TRADEMARK OFFICE
CERTIFICATE OF CORRECTION

PATENT NO. : 10,116,216 B2
APPLICATION NO. : 15/084345
DATED : October 30, 2018
INVENTOR(S) : Jinseok Park et al.

Page 1 of 1

It is certified that error appears in the above-identified patent and that said Letters Patent is hereby corrected as shown below:

In the Claims

In Column 12, Line 8, delete "thane" and replace with -- than --;
In Column 13, Line 46, delete "section".

Signed and Sealed this
Fourth Day of December, 2018

Andrei Iancu
*Director of the United States Patent and Trademark Office*